(12) United States Patent
Ducellier (10) Patent No.: US 6,711,316 B2
(45) Date of Patent: Mar. 23, 2004

(54) WAVELENGTH CROSS-CONNECT

(75) Inventor: Thomas Ducellier, Ottawa (CA)

(73) Assignee: JDS Uniphase Inc., Ottawa (CA)

( * ) Notice: Subject to any disclaimer, the term of this patent is extended or adjusted under 35 U.S.C. 154(b) by 0 days.

(21) Appl. No.: 10/201,361

(22) Filed: Jul. 24, 2002

(65) Prior Publication Data

US 2003/0021522 A1 Jan. 30, 2003

Related U.S. Application Data

(60) Provisional application No. 60/307,379, filed on Aug. 13, 2001.

(51) Int. Cl.[7] .................................................. G02B 6/35
(52) U.S. Cl. ............................... 385/17; 385/24; 385/18
(58) Field of Search ........................ 385/16–23, 24; 359/223–226

(56) References Cited

U.S. PATENT DOCUMENTS

| | | | |
|---|---|---|---|
| 5,914,801 A | 6/1999 | Dhuler et al. ................ 359/230 |
| 6,087,747 A | 7/2000 | Dhuler et al. ................ 310/90 |
| 6,097,859 A | 8/2000 | Solgaard et al. ............. 385/17 |
| 6,134,042 A | 10/2000 | Dhuler et al. ................ 359/224 |
| 6,289,145 B1 | 9/2001 | Solgaard et al. ............. 385/17 |
| 6,327,398 B1 | 12/2001 | Solgaard et al. ............. 385/18 |
| 6,366,715 B1 | 4/2002 | Wang ......................... 385/17 |
| 6,374,008 B2 | 4/2002 | Solgaard et al. ............. 385/17 |
| 6,389,190 B2 | 5/2002 | Solgaard et al. ............. 385/18 |
| 6,424,756 B1 * | 7/2002 | Kalman et al. .............. 385/16 |
| 6,434,291 B1 * | 8/2002 | Kessler et al. .............. 385/24 |
| 6,603,894 B1 * | 8/2003 | Pu ............................. 385/18 |
| 2002/0009257 A1 | 1/2002 | Bouevitch et al. ........... 385/24 |
| 2002/0033976 A1 | 3/2002 | Holmes ...................... 359/124 |
| 2002/0061157 A1 | 5/2002 | Ducellier et al. ............ 385/17 |
| 2002/0061158 A1 | 5/2002 | Ducellier .................... 385/17 |
| 2002/0067880 A1 * | 6/2002 | Huber et al. ................. 385/17 |
| 2002/0076136 A1 | 6/2002 | Ducellier et al. ............ 385/17 |
| 2002/0076146 A1 | 6/2002 | Iyer et al. ................... 385/24 |
| 2002/0085793 A1 | 7/2002 | Ducellier .................... 385/17 |
| 2002/0090169 A1 | 7/2002 | Ducellier et al. ............ 385/18 |
| 2002/0135855 A1 * | 9/2002 | Daneman et al. ........... 359/290 |
| 2002/0141687 A1 * | 10/2002 | Iyer et al .................... 385/16 |
| 2003/0012486 A1 * | 1/2003 | Ducellier et al. ............ 385/17 |

FOREIGN PATENT DOCUMENTS

CA 2326362 11/2000

OTHER PUBLICATIONS

J.S. Patel and Y. Silberberg, "Liquid Crystal and Grating––Based Multiple–Wavelength Corss–Connect Switch", IEEE Photonics Technology Letters, vol. 7, pp. 514–516, 1995.

* cited by examiner

*Primary Examiner*—Heang Sanghavi
*Assistant Examiner*—Scott A Knauss
(74) *Attorney, Agent, or Firm*—Teitelbaum & MacLean; Neil Teitelbaum; Doug MacLean (57) ABSTRACT

An optical cross-connect having an input port for launching a beam of light into the optical cross-connect, at least two output ports, each output port for selectively receiving a beam of light, a dispersive element for dispersing the beam of light into separate wavelength channels, and a switch core for independently switching at least one individual wavelength channel between ports. The switch core includes a cylindrical ATO element, two cylindrical relay lenses, and two opposing deflector arrays. Conveniently, the deflector arrays are either liquid crystal phase arrays or reflective MEMS arrays.

20 Claims, 6 Drawing Sheets

WAVELENGTH CROSS-CONNECT

CROSS-REFERENCE TO RELATED APPLICATIONS

This application claims priority from U.S. provisional application Ser. No. 60/307,379 filed on Jul. 25, 2001.

MICROFICHE APPENDIX

Not Applicable

FIELD OF THE INVENTION

The present invention relates generally to optical switches and in particular to a wavelength cross-connect.

BACKGROUND OF THE INVENTION

Optical switches are commonly used in communications systems for transmitting voice, video and data signals. An optical cross-connect is an optical switch that includes multiple input and/or output ports and has the ability to connect, for purposes of signal transfer, any input port/output port combination, and preferably, for N×M switching applications, to allow for multiple connections at one time. A wavelength cross-connect is a cross-connect that allows individual channels of a wavelength multiplexed optical signal to be switched or routed independently from the others.

Generally, optical signals are transmitted and/or received at each port of a switch via an end of an optical waveguide. The waveguide ends of the input and output ports are optically coupled via a switch core. In this regard, for example, the input and output waveguide ends can be physically located on opposite sides of a switch core for direct or folded optical pathway communication therebetween, in side-by-side matrices on the same physical side of a switch core facing a mirror, or they can be interspersed in a single matrix arrangement facing a mirror.

Establishing a connection between a given input port and a given output port, involves configuring an optical pathway across the switch core between the input ports and the output ports. One way to configure the optical pathway is by moving or bending optical fibers using, for example, piezo-electric benders. Another way of configuring the optical path between an input port and an output port involves the use of one or more moveable deflectors interposed between the input and output ports. In this case, the waveguide ends remain stationary and the deflectors are used for switching. For example, moveable mirrors can allow for one-dimensional or two-dimensional targeting to optically connect any of the input port fibers to any of the output port fibers and vice versa. For example, U.S. Pat. No. 5,914,801, entitled MICROELECTROMECHANICAL DEVICES INCLUDING ROTATING PLATES AND RELATED METHODS, which issued to Dhuler et al on Jun. 22, 1999; U.S. Pat. No. 6,087,747, entitled MICROELECTROMECHANICAL BEAM FOR ALLOWING A PLATE TO ROTATE IN RELATION TO A FRAME IN A MICRO-ELECTROMECHANICAL DEVICE, which issued to Dhuler et al on Jul. 11, 2000; and U.S. Pat. No. 6,134,042, entitled REFLECTIVE MEMS ACTUATOR WITH A LASER, which issued to Dhuler et al on Oct. 17, 2000, disclose micro-electromechanical mirrors that can be controllably moved in two dimensions to effect optical switching.

In wavelength cross-connects, it is generally necessary to demultiplex the optical signal before independent wavelengths are switched and remultiplex after the wavelength signals are switched. For example, both U.S. Pat. No. 6,097,859 entitled MULTI-WAVELENGTH CROSS-CONNECT OPTICAL SWITCH, issued to Solgard et al on Aug. 1, 2000, and U.S. Pat. Appl. No. 200020033976 entitled METHOD AND DEVICE FOR SWITCHING WAVELENGTH DIVISION MULTIPLEXED OPTICAL SIGNALS USING GRATINGS to Holmes, published on Mar. 21, 2002, disclose a switch wherein light is demultiplexed/multiplexed via a wavelength dispersive grating.

SUMMARY OF THE INVENTION

The instant invention relates to a wavelength cross-connect that utilizes a dispersive system, such as a dispersive grating, for demultiplexing and multiplexing optical signals and a switch core based on independently controllable deflectors. Advantageously, the switch core uses cylindrical optics including an angle-to-offset (ATO) element disposed between the deflectors to provide for a re-imaging, and hence a low loss.

In accordance with the invention there is provided a wavelength cross-connect comprising: an input port for launching an optical beam into the wavelength cross-connect; dispersive means for spatially separating the optical beam into individual wavelength channels; beam deflecting means optically coupled to the dispersive means for selectively deflecting each of the individual wavelength channels in a predetermined manner; a ATO element for providing angle to offset transformation for each of the deflected wavelength channels; relay means for relaying light corresponding to each of the individual wavelength channels to and from the ATO element; and a plurality of output ports, wherein said wavelength cross-connect is configured for independently switching at least one wavelength channel from the input port to one of the plurality of output ports.

In accordance with the invention there is provided a wavelength cross-connect comprising: an input port for launching a beam of light into the wavelength cross-connect; a first dispersive element for dispersing the beam of light into a plurality of sub-beams of light; a switch core for routing each sub-beam along a respective predetermined optical path therein; a second dispersive element for recombining the plurality of sub-beams routed by the switch core to produce a plurality of output beams of light, each output beam having a composition dependent on the respective predetermined optical paths; a plurality of output ports, each output port for respectively receiving one of the plurality of output beams; and beam redirecting means for providing an optical pathway between the input port, the first dispersive element, the switch core, the second dispersive element, and the plurality of output ports, wherein the switch core includes: first and second opposed optical arrays, each optical array including a plurality of independently operable beam deflectors; an ATO element having optical power disposed between the first and second opposed optical arrays for providing an angle-to-offset transformation for light transmitted between the first and second optical arrays; and relay means for redirecting light transmitted between the first optical array and the second optical array via the ATO element.

In accordance with the invention there is provided a wavelength cross-connect comprising: N linearly aligned input ports; a first diffraction grating for dispersing an input beam of light launched from one of the N input ports into M wavelength channel signals, said first diffraction grating having grating lines substantially parallel to the direction in which the plurality of input ports are aligned; a first deflector array including N×M independently controlled elements, said first deflector array disposed such that each channel signal transmitted from the first diffraction grating is passed to a separate element on the first deflector array; a second deflector array including N×M independently controlled elements, said second deflector array opposing the first deflector array; a cylindrical ATO lens optically disposed between the first and second deflector arrays, said ATO lens disposed for providing angle to offset transformations in a direction parallel to the grating lines; first and second cylindrical relay lenses disposed for providing optical power in a plane perpendicular to the grating lines, said first relay lens optically disposed between the first deflector array and the ATO lens, said second relay lens optically disposed between the second deflector array and the ATO lens; a second diffraction grating for combining channel signals transmitted from the second deflector array into a plurality of output beams of light; and N linearly aligned output ports for receiving the plurality of output beams of light.

In accordance with the invention there is provided a wavelength cross-connect comprising: a first optical array including an array of independently controlled deflector elements; a second optical array including an array of independently controlled deflector elements, said second optical array opposing said first optical array; a cylindrical ATO lens optically disposed between said first and second optical arrays, said ATO lens disposed for transforming an angle induced by the first optical array into an offset at the second optical array; and first and second cylindrical relay lenses disposed for providing optical power in a plane perpendicular the offset, said first relay lens optically disposed between the first optical array and the ATO lens, said second relay lens optically disposed between the second optical array and the ATO lens.

BRIEF DESCRIPTION OF THE DRAWINGS

Exemplary embodiments of the invention will now be described in conjunction with the drawings in which:

FIG. 1b is a side view of the optical cross-connect illustrated in FIG. 1a;

FIG. 1c is a plan view of the switch core illustrated in FIG. 1a;

FIG. 1d is a side view of the switch core illustrated in FIG. 1a;

DETAILED DESCRIPTION

The present invention provides a free-space optical cross-connect having N input ports, N output ports, and is capable of switching any of M wavelength channels, such as International Telecommunication Union (ITU) channels, transmitted from any input port to any output port, each independently of any other.

Figure 1A:
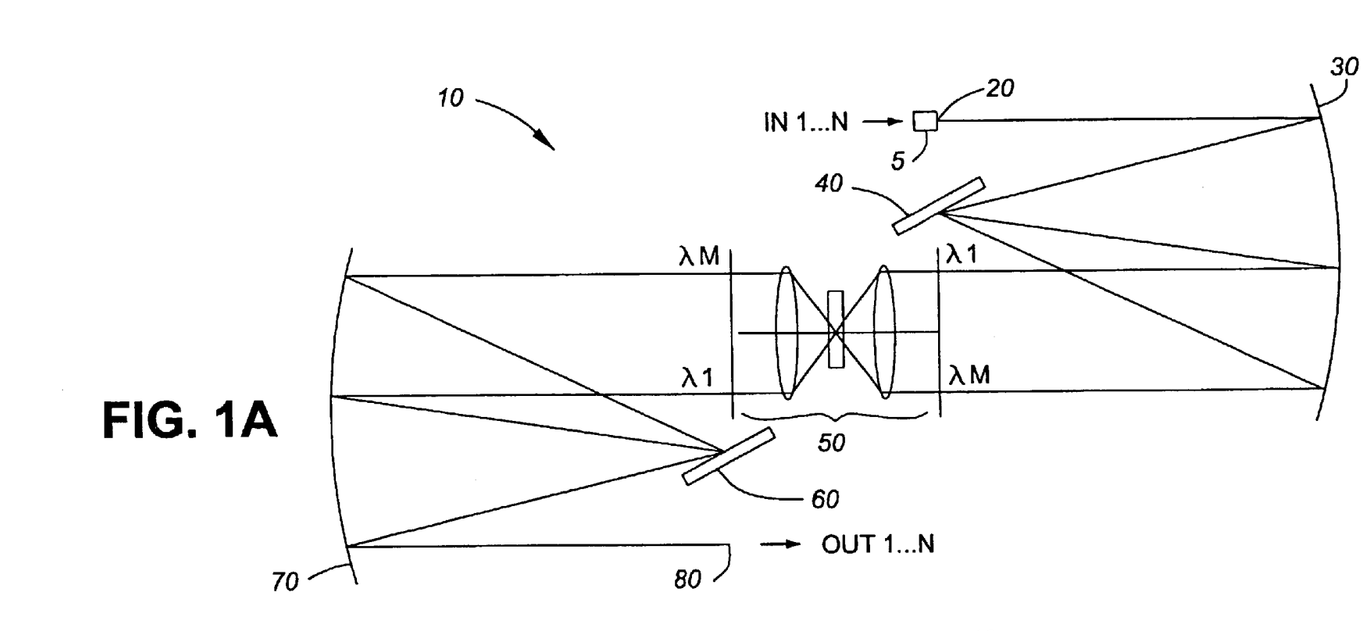
FIG. 1a is a schematic drawing of an optical cross-connect in accordance with an embodiment of the instant invention, the optical cross-connect including a switch core having an array of liquid crystal deflectors.

Referring to FIG. 1a, there is shown a schematic illustration of a wavelength cross-connect 10 in accordance with an embodiment of the present invention. The wavelength cross-connect 10 includes a plurality of input ports 20, a spherical mirror 30, a diffraction grating 40, an optical switch core 50, a diffraction grating 60, a spherical mirror 70 and a plurality of output ports 80.

The input 20 and output 80 ports correspond to locations where optical signals enter or leave the cross-connect 10, and in use, are typically coupled to optical waveguides, e.g. optical fibers, not shown. In the plan view shown in FIG. 1a, each of the plurality of input 20 and output 80 ports is shown as a linear array of ports perpendicular the plane of the page, however, other arrangements are also possible. Further, although this description includes references to input and output ports for purposes of illustration, it is understood that an individual port may function as an input port and/or an output port depending upon the direction of light propagation.

The spherical mirrors 30, 70, which are shown as concave spherical mirrors, are arranged to focus light onto diffraction gratings 40, 60, respectively. In particular, diffraction grating 40 is disposed approximately at the focal point of spherical mirror 30 with the plurality of input ports 20 and switch core 50 symmetrically disposed about the diffraction grating 40, while diffraction grating 60 is disposed approximately at the focal point of spherical mirror 70 with the plurality of output ports 80 and switch core 50 symmetrically disposed about the diffraction grating 60. Preferably, the input ports 20, switch core 50, and the output ports 80 are disposed about one focal length away from a spherical mirror 30, 70. Optionally, each of the spherical mirrors 30, 70 is replaced with other element having optical power, such as an appropriately placed cylindrical reflector. Alternatively, each of the spherical mirrors 30, 70 is replaced with a conventional 4f lens system using spherical or cylindrical lenses, however, such an arrangement is associated typically with more alignment problems. Further alternatively, the diffraction gratings 40, 60 and spherical mirrors 30, 70 are optionally replaced with concave diffraction gratings (not shown) and the optical arrangement adjusted accordingly.

Figure 1B:
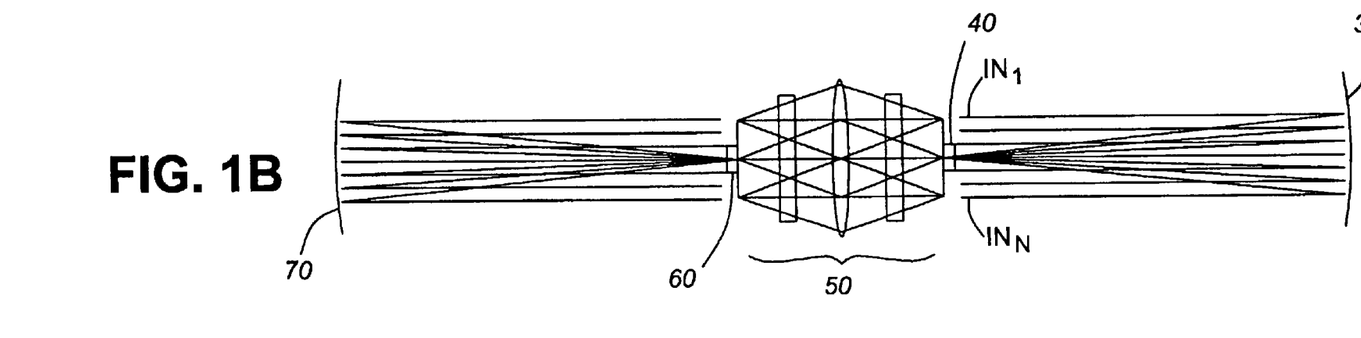

FIG. 1b, which is a side view of FIG. 1a, illustrates how the spherical mirrors 30, 70 focus light onto the diffraction grating 40. For example, FIG. 1b shows each beam of light launched from the plurality of input ports 20 transmitted along a separate input optical path and focussed to a same point on the diffraction grating 40 by spherical mirror 30. FIG. 1b further shows the spherical mirror 30 reflecting each dispersed beam of light to the switch core 50 along an optical path parallel to the input optical paths (i.e., the input optical paths are shown behind the respective optical paths of the reflected dispersed beams of light).

The diffraction gratings 40, 60, which are preferably high efficiency, high dispersion diffraction gratings, are shown having grating lines perpendicular to the plane of the paper in FIG. 1a. Accordingly, each beam of light transmitted from the plurality of input ports 20 is spatially (angularly) dispersed according to wavelength in a dispersion plane approximately parallel to the plane of the paper such that the switch core 50 receives as input, N stacks of dispersed beams of light, each dispersed beam corresponding to M channels.

Figure 1C:
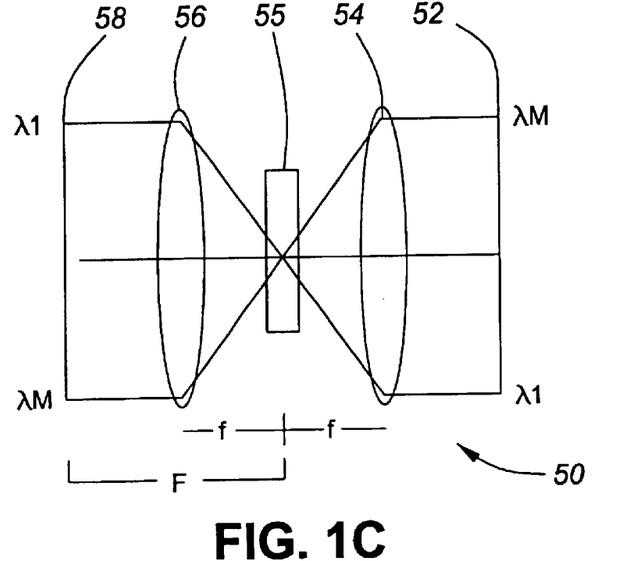
Figure 1D:
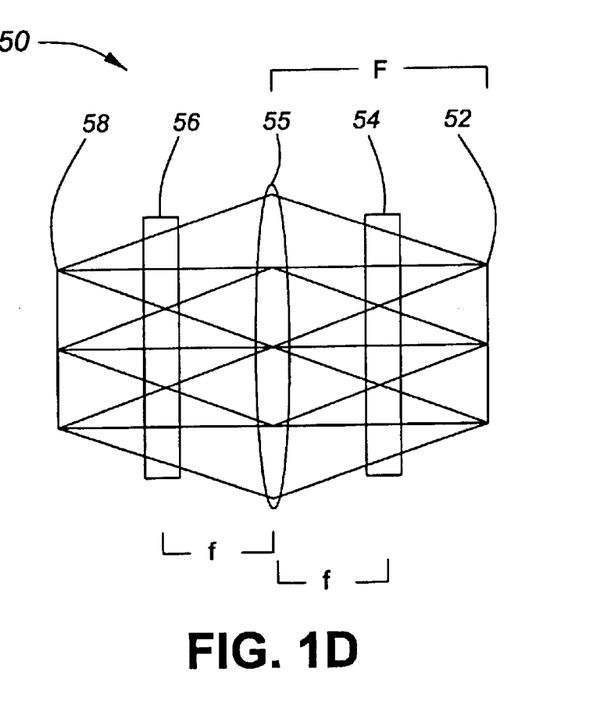

Referring to FIG. 1c, the switch core 50 includes two opposing deflector arrays 52, 58, two symmetrically disposed cylindrical lenses 54, 56 and an angle-to-offset (ATO) lens 55. Preferably, the ATO lens 55 is a cylindrical lens with a cylindrical curvature perpendicular to the cylindrical curvature of the cylindrical lenses 54, 56.

In the instant embodiment, each deflector array 52, 58 includes an N×M matrix of individually controllable elements, for example liquid crystal elements, wherein each transmissive element selectively deflects (about one dimension) light transmitted therethrough at a controllable angle, for example under control of an applied electric field. For example, liquid crystal phase array elements, which provide selective beam steering via refractive index control, are known in the art and are not discussed further herein. Alternatively, another arrangement or transmission-type switch fabric is used.

Referring again to FIG. 1c, each cylindrical lens 54, 56 is arranged to provide optical power only in planes parallel to the plane of the page. For example, exterior lens 54 provides focussing in the wavelength dimension, but does not reduce the beam size in the non-varying dimension, i.e., parallel to the grating lines. Accordingly, light associated with each of the N horizontal stacks of dispersed beams of light does not 'switch' horizontal planes as a result of being transmitted through either exterior lens 54, 56. In contrast, the central ATO lens 55 has a cylindrical curvature perpendicular to the cylindrical curvatures of the exterior lenses 54, 56, and only provides optical power in planes perpendicular to the plane of FIG. 1c. In fact, the ATO lens 55 is provided for angle-to-offset directing properties in the vertical direction (i.e., parallel to the diffraction grating lines). In particular, the ATO lens 55 operates to redirect any beam propagating at a given angle at its front focal plane to a fixed offset at its back focal plane and vice versa. The ATO principle is described in further detail in Canadian Patent Application No. 2,326,362, the disclosure of which is herein incorporated by reference.

While not essential for the purpose of the present invention, it is preferred than the ATO lens 55 have a focal length, F, that corresponds approximately to the near zone length (multi mode) or the Rayleigh range (single mode) of a beam of light propagating through the ATO lens 55. It is also preferred that the ATO lens 55 is centred within the switch core 50 with each of the deflector arrays 52, 58 disposed approximately in a focal plane thereof. Similarly, it is preferred that cylindrical lenses 52, 56 have a focal length, f, and that the deflector arrays 52, 58 are also disposed approximately in the focal plane thereof. The use of such an lens system means that the size, i.e. the cross-sectional area, of a beam of light transmitted through the switch core 50 will be substantially the same at each of the deflector matrixes 52, 58. Furthermore, ensuring that light passing through the device has a beam waist at each of the deflector arrays (i.e., when transmitted from the spherical lenses 30, 70 and from the ATO lens 55, advantageously provides for more efficient coupling between input 20 and output ports 80 and a more compact cross-connect.

Notably, the use of cylindrical optics in the switch core 50 is believed to provide superior optical performance. For example, the use of exterior cylindrical lenses 54, 56 for providing relay within in the switch core in the wavelength dimension reduces loss in resolution. Furthermore, since the ATO lens 55 of the instant embodiment is cylindrical, switching is only provided between vertical ports.

Preferably, a polarization diversity unit 5, 85 is coupled to each of the plurality of input ports 20 and output ports 80. The polarization diversity unit converts an input beam of light into collimated light having a known polarization state in a manner well known in the art, and hence, advantageously removes polarization problems from the deflector arrays 52, 58 and/or diffraction gratings 30, 70. For example, in one embodiment the input polarization diversity unit 5 transforms an input beam of light into two vertically displaced sub-beams of light having a same polarization state, while the output polarization diversity unit 85 transforms two vertically displaced sub-beams of light having a same polarization state into a single beam of light. Accordingly, diversity arrangements described in U.S Pat. Appl. No. 20020009257 to Bouevitch et al. entitled OPTICAL CONFIGURATION FOR A DYNAMIC GAIN EQUALIZER AND A CONFIGURABLE ADD/DROP MULTIPLEXER, and incorporated herein by reference, are appropriate for use in the instant invention. Notably, the use of this type of polarization diversity arrangement reduces the number of optical ports achievable in half.

Figure 2A:
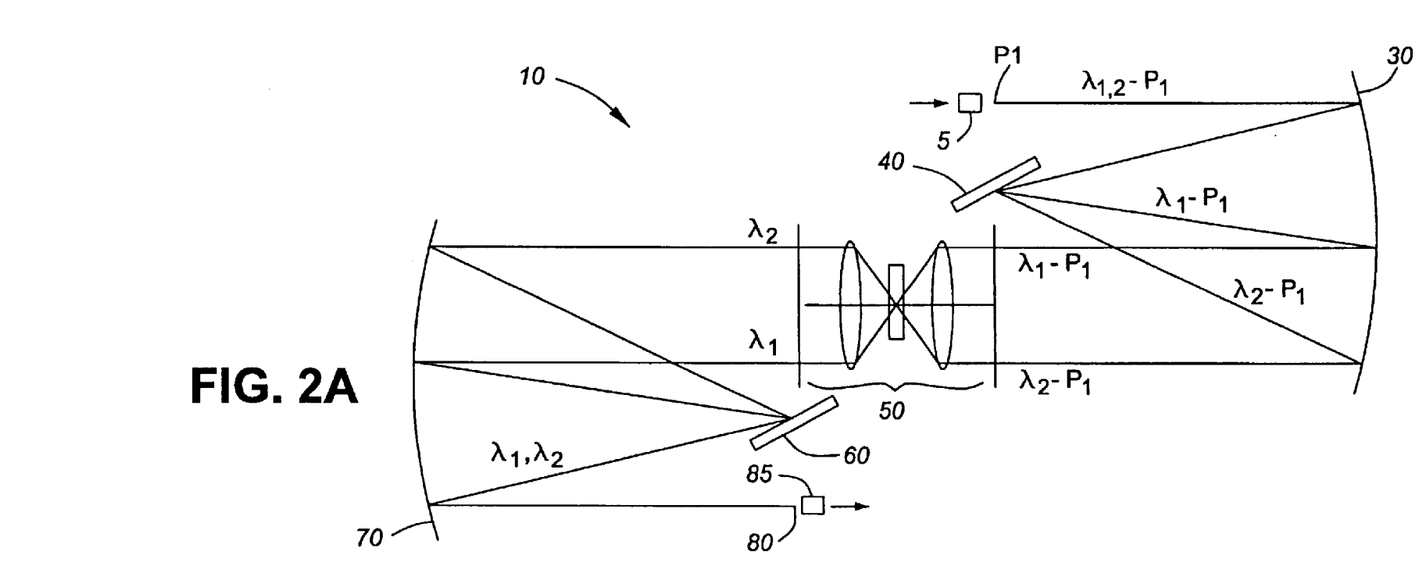
FIG. 2a is a ray diagram illustrating the operation of the optical cross-connect shown in FIG. 1a, wherein N=3 and M=2.
Figure 2B:
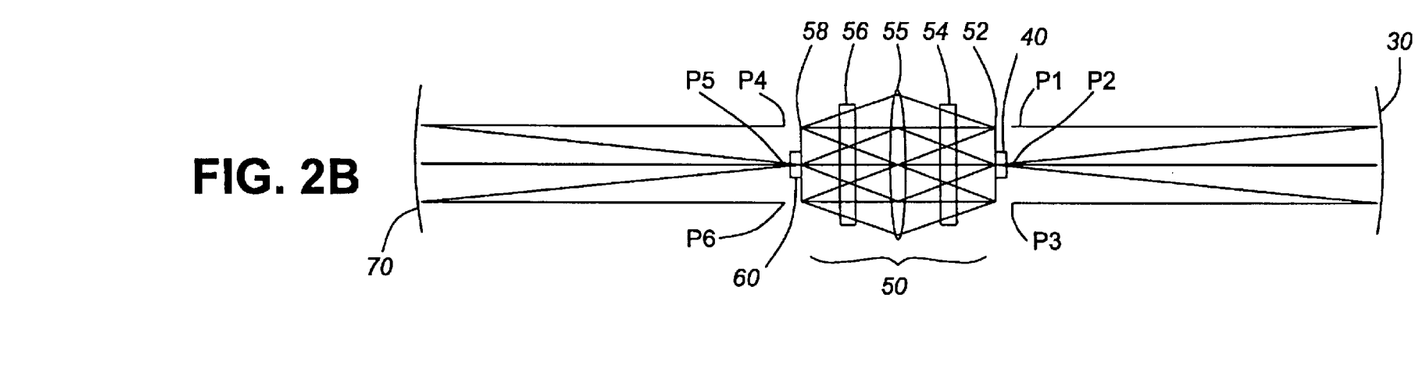
FIG. 2b is a ray diagram illustrating the operation of the optical cross-connect shown in FIG. 1a from the side.

Operation of the cross-connect shown in FIG. 1a is illustrated with respect to FIGS. 2a,b wherein same numerals refer to same parts, without further description. For ease of illustration, the cross-connect 10 is shown having three input ports and three output ports, each of the input/output ports for transmitting an optical signal corresponding to two wavelength channels (i.e., N=3, M=2). It will be appreciated, however, that more than two channels and more than three input/output ports are readily accommodated by the present invention.

Referring to FIG. 2a, a collimated beam of light having a predetermined polarization and carrying channels $\lambda_{1\text{-}P1}$ and $\lambda_{2\text{-}P1}$ is launched from input port $P_1$, while a second collimated beam of light having a same predetermined polarization and carrying channels $\lambda_{1\text{-}P2}$ and $\lambda_{2\text{-}P2}$ is launched simultaneously from $P_2$, and a third collimated beam of light having a same predetermined polarization and carrying channels $\lambda_{1\text{-}P3}$ and $\lambda_{2\text{-}P3}$ is launched simultaneously from $P_3$. The first, second, and third collimated beams of light are transmitted to the spherical mirror 30 along parallel optical paths that are vertically displaced from one another. The spherical mirror 30 focuses, or redirects, each of the collimated beams of light to a same overlapping region of the diffraction grating 40. Each beam of light is spatially dispersed according to wavelength in an approximately horizontal dispersion plane. The spatially dispersed beams of light are transmitted to spherical mirror 30, where they are collimated (i.e., transmitted along parallel horizontal planes coincident with each respective input beam of light), and transmitted to the switch core 50. The dispersed beams of light are incident on the input deflector array 52 such that each spatially dispersed component corresponding to a separate channel is passed through an independently controlled pixel in the liquid crystal deflector array 52. For example, each of six sub-beams of light corresponding to channels $\lambda_{1\text{-}P1}$ $\lambda_{2\text{-}P1}$, $\lambda_{1\text{-}P2}$, $\lambda_{2\text{-}P2}$, $\lambda_{1\text{-}P3}$, and $\lambda_{2\text{-}P3}$ will impinge a separate element of the 2×3 matrix of the deflector array 52.

Referring to FIG. 2b, the upper elements of the deflector array 52 deflect each sub-beam of light corresponding to $\lambda_{1\text{-}P1}$ and $\lambda_{2\text{-}P1}$ in an upwards direction, where it is transmitted to an upper element of deflector array 58, straight through, where it is transmitted to a middle element of array 58, or, in a downwards direction, where it is transmitted to a lower element of array 58. Similarly, the middle elements of the deflector array 52 deflect each sub-beam of light corresponding to $\lambda_{1\text{-}P2}$ and $\lambda_{2\text{-}P2}$ in an upwards direction, where it is transmitted to an upper element of deflector array 58, straight through, where it is transmitted to a middle element of array 58, or, in a downwards direction, where it is transmitted to a lower element of array 58. Likewise, the lower elements of the deflector array 52 deflect each sub-beam of light corresponding to $\lambda_{1\text{-}P3}$ and $\lambda_{2\text{-}P3}$ in an upwards direction, where it is transmitted to an upper element of array 58, straight through, where it is transmitted to a middle element of array 58, or, in a downwards direction, where it is transmitted to a lower element of array 58. Notably, the above operational description illustrates the angle-to-offset transformations provided by the ATO lens. In particular, light launched from $P_1$ into the deflector array 52 is shown deflected at three different angles, each of which is transformed into a vertical offset upon exiting the ATO lens (i.e., each of the three rays representing light deflected at a different angle by an upper element of the deflector array 52 is shown passing through the ATO lens, where they are transmitted to a separate element of deflector array 58, along parallel optical paths).

The output deflector array 58 corrects angular misalignment and transmits the modified sub-beams of light to the spherical mirror 70. The spherical mirror 70 reflects each sub-beam to a single point on the diffraction grating 60, where they are combined to form three output signals. Each output signal is transmitted back to the spherical mirror 70 and is transmitted to one of port 4 (P4), port 5 (P5), and port 6 (P6), respectively. Accordingly, each of P4, P5, and P6 will transmit a multiplexed optical signal corresponding to one of $\lambda_{1\text{-}P1}$ and $\lambda_{2\text{-}P2}$, $\lambda_{1\text{-}P1}$ and $\lambda_{2\text{-}P3}$, or $\lambda_{1\text{-}P2}$ and $\lambda_{2\text{-}P3}$.

Advantageously, the use of liquid crystal deflector arrays in transmission, as described above, allows any wavelength channel transmitted through planar array 52 to be switched to any position on the opposite planar array 58. Furthermore, the use of liquid crystal deflector arrays provides potential for more than just wavelength switching. For example, by modifying the efficiency of each liquid crystal cell, or by modifying the deflection angle to negatively affect coupling between ports, the cross-connect in accordance with the instant embodiment is capable of gain equalization. Alternatively, if the deflector array permits it, multicasting is possible.

Figure 3A:
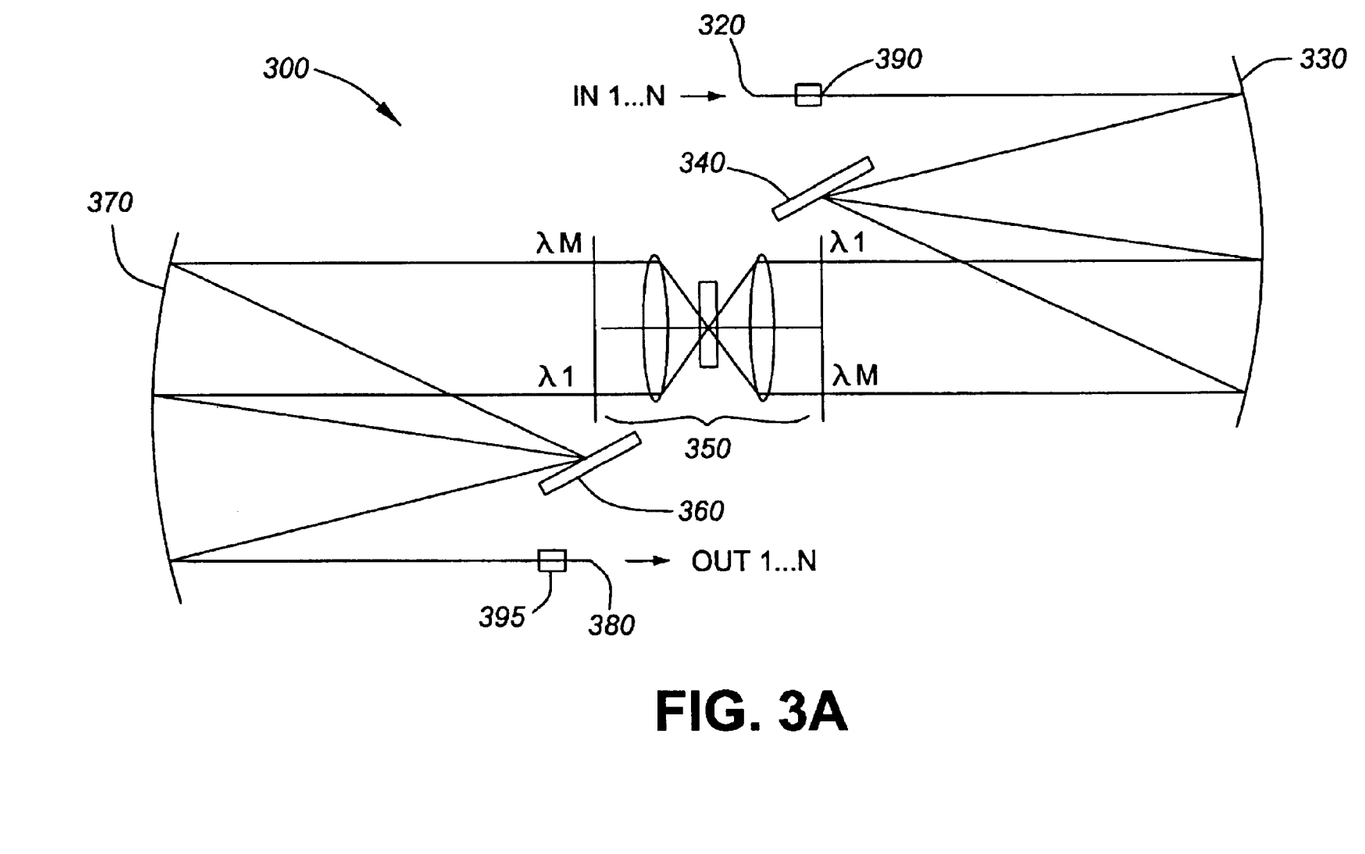
FIG. 3a is a schematic drawing of an optical cross-connect in accordance with another embodiment of the instant invention, wherein the switch core includes an array of MEMS mirror deflectors.

Referring to FIG. 3a, there is shown a schematic illustration of a wavelength cross-connect 310 in accordance with another embodiment of the present invention. The wavelength cross-connect 310 includes a plurality of input ports 320, a spherical mirror 330, a diffraction grating 340, an optical switch core 350, a diffraction grating 360, a spherical mirror 370 and a plurality of output ports 380. Coupled to the plurality of input ports is an input relay lens 390 and to the plurality of output ports an output relay lens 395.

The input 320 and output 380 ports correspond to locations where optical signals enter or leave the cross-connect 310, and in use, are typically coupled to optical waveguides, e.g. optical fibers, not shown. In the plan view shown in FIG. 3a, each of the plurality of input 320 and output 380 ports is shown as a linear array of ports perpendicular the plane of the page, however, other arrangements are also possible. Further, although this description includes references to input and output ports for purposes of illustration, it is understood that an individual port may function as an input port and/or an output port depending upon the direction of light propagation.

The spherical mirrors 330, 370, which are shown as concave spherical mirrors, are arranged to redirect light onto diffraction gratings 340, 360, respectively. In particular, diffraction grating 340 is disposed approximately at the focal point of spherical mirror 330 with the plurality of input ports 320 and switch core 350 symmetrically disposed about the diffraction grating 340, while diffraction grating 360 is disposed approximately at the focal point of spherical mirror 370 with the plurality of output ports 380 and switch core 350 symmetrically disposed about the diffraction grating 360. Preferably, a focal plane of input relay lens 390, the switch core 350, and a focal plane of the output relay lens 395, are each disposed about one focal length away from a spherical mirror 330, 370. Optionally, each of the spherical mirrors 330, 370 is replaced with other element having optical power, such as an appropriately placed cylindrical reflector. Alternatively, each of the spherical mirrors 330, 370 is replaced with a conventional 4f lens system using spherical or cylindrical lenses, however, such an arrangement is associated typically with more alignment problems. Further alternatively, the diffraction gratings 40, 60 and spherical mirrors 30, 70 are optionally replaced with concave diffraction gratings (not shown).

Figure 3B:
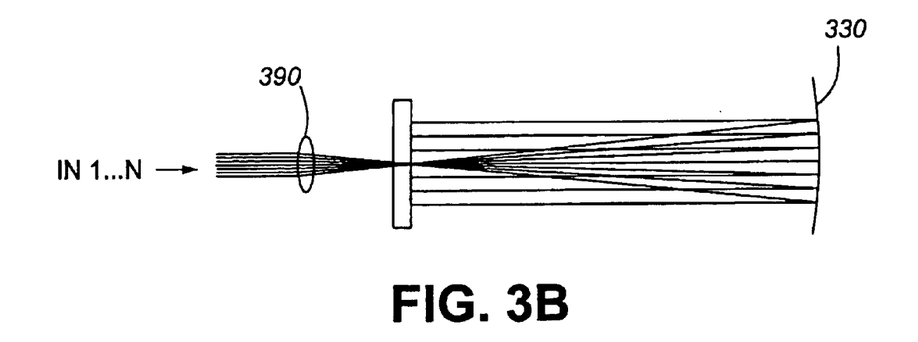
FIG. 3b is a side view of the optical cross-connect illustrated in FIG. 3a showing the input optics.

FIG. 3b, which is a side view of the input dispersion block shown in FIG. 3a, illustrates how the spherical mirrors 330, 370 redirect light onto the diffraction grating 340. For example, FIG. 3b shows each beam of light launched from the plurality of input ports 320 transmitted along a separate input optical path that intercepts at the focal point of relay lens 390. The spherical mirror 330 redirects each of these angled beams of light along a parallel optical path to the diffraction grating 340. FIG. 3b further shows the spherical mirror 330 focussing each dispersed beam of light to the switch core 350 along an optical path parallel to the input optical paths (i.e., the input optical paths are shown behind the respective optical paths of the reflected dispersed beams of light).

The diffraction gratings 340, 360, which are preferably high efficiency, high dispersion diffraction gratings, are shown having grating lines perpendicular to the plane of the paper in FIG. 3a. Accordingly, each beam of light transmitted from the plurality of input ports 320 is spatially (angularly) dispersed according to wavelength in a dispersion plane approximately parallel to the plane of the paper such that the switch core 350 receives as input, N stacks of dispersed beams of light, each dispersed beam corresponding to M channels.

Figure 3C:
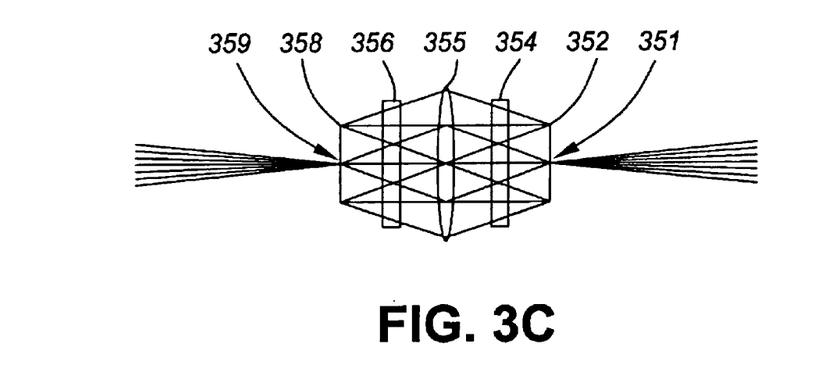
FIG. 3c is a side view of the optical cross-connect illustrated in FIG. 3a showing a by-pass in the switch core.
Figure 3D:
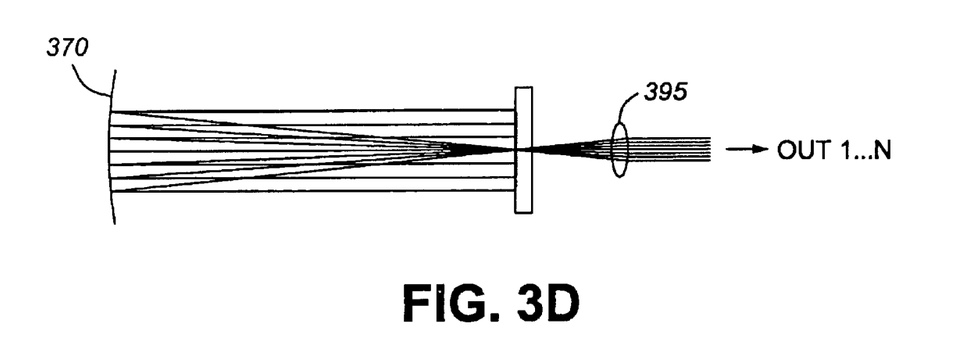
FIG. 3d is a side view of the optical cross-connect illustrated in FIG. 3a showing the output optics.

Referring to FIG. 3c, the switch core 350 includes two opposing deflector arrays 352, 358, two symmetrically disposed cylindrical lenses 354, 356 and an angle-to-offset (ATO) lens 355. Preferably, the ATO lens 355 is a cylindrical lens with a cylindrical curvature perpendicular to the cylindrical curvatures of the cylindrical lenses 354, 356.

In the instant embodiment, each deflector array 352, 358 includes an N×M matrix of MEMS mirrors, wherein each MEMS mirror is preferably provided as a one- or two-dimensionally tiltable micro-mirror that is selectively oriented, in a manner known in the art, to deflect a light beam received from any optical element of the output array 358 to any other optical element of the input array 352. In this manner, each MEMS mirror is selectively positioned to define an optical path. This positioning capability of each MEMS mirror enables highly versatile switching of light beams within the switch core 350. Reflective MEMS arrays are known in the art and will not be discussed further herein.

Each MEMS array 352, 358 is provided with an optical bypass 351, 359, respectively, that serves as a via-line to enter and/or exit the switch core 350. The term optical bypass, as used herein, refers to means for providing an unobstructed path that enables light beams to enter/exit the switch core 350. This is accomplished by providing an opening that defines a passage through which light beams can pass. Alternatively, each optical bypass can be provided as a region of the switch core structure that is substantially transparent to optical wavelengths of light beams being switched through optical cross-connect 310. This latter arrangement can be readily achieved by providing the switch core 350 on a conventional Si and/or SiO$_2$ substrate, which is typically transparent to the wavelengths of interest. In this case, the optical bypass is readily constructed by providing a suitably sized region of the substrate that is unobstructed by the deflectors and/or associated deflector control circuitry.

Of course, those skilled in the art will appreciate that the optical switching is alternatively performed by a reflective-type switch fabric other than that described herein. For example, the reflective array is optionally designed with a plurality of by-passes and the relay optics adjusted accordingly.

Referring again to FIG. 3a, each cylindrical lens 354, 356 is arranged to only provide optical power in planes parallel to the plane of the page. For example, exterior lens 354 provides focussing in the wavelength dimension, but does not reduce the beam size in the non-varying dimension, i.e., parallel to the grating lines. Accordingly, light associated with each of the N horizontal stacks of dispersed beams of light does not 'switch' horizontal planes as a result of being transmitted through either exterior lens 354, 356. In contrast, the central ATO lens 355 has a cylindrical curvature perpendicular to the cylindrical curvatures of the exterior lenses 354, 356, and only provides optical power in planes perpendicular to the plane of FIG. 3a. In fact, the ATO lens 355 is provided for angle-to-offset directing properties in the vertical direction (i.e., parallel to the diffraction grating lines). In particular, the ATO lens 355 operates to redirect any beam propagating at a given angle at its front focal plane to a fixed offset at its back focal plane and vice versa.

While not essential for the purpose of the present invention, it is preferred than the ATO lens 355 have a focal length, F, that corresponds approximately to the near zone length (multi mode) or the Rayleigh range (single mode) of a beam of light propagating through the ATO lens 355. It is also preferred that the ATO lens 355 is centred within the switch core 350 with each of the deflector arrays 352, 358 disposed approximately in a focal plane thereof. Similarly, it is preferred that cylindrical lenses 352, 356 have a focal length, f, and that the deflector arrays 352, 358 are also disposed approximately in the focal plane thereof. The use of such an lens system means that the size, i.e. the cross-sectional area, of a beam of light transmitted through the switch core 350 will be substantially the same at each of the deflector matrixes 352, 358. Furthermore, ensuring that light passing through the device has a beam waist at each of the deflector arrays (i.e., when transmitted from the spherical lenses 330, 370 and from the ATO lens 355, advantageously provides for more efficient coupling between input 320 and output ports 380 and a more compact cross-connect.

Notably, the use of cylindrical optics in the switch core 350 is believed to provide superior optical performance. For example, the use of exterior cylindrical lenses 354, 356 for providing relay within in the switch core in the wavelength dimension reduces loss in resolution. Furthermore, since the ATO lens 355 of the instant embodiment is cylindrical, switching is only provided between vertical ports.

Preferably, a polarization diversity unit (not shown) is coupled to each of the plurality of input ports 320 and output ports 380. The polarization diversity unit converts an input beam of light into collimated light having a known polarization state in a manner well known in the art, and hence, advantageously removes polarization problems from the deflector arrays 352, 358 and/or diffraction gratings 330, 370. For example, polarization diversity arrangements described in U.S Pat. Appl. No. 20020009257 to Bouevitch et al. entitled OPTICAL CONFIGURATION FOR A DYNAMIC GAIN EQUALIZER AND A CONFIGURABLE ADD/DROP MULTIPLEXER, and incorporated herein by reference, are appropriate for use in the instant invention. Notably, the use of this type of polarization diversity arrangement reduces the number of optical ports achievable in half.

In operation, a collimated beam of light having a predetermined polarization and carrying multiple channels is launched from each of the input ports 20, as discussed in the previous embodiment. Each collimated beam of light is transmitted to the relay lens 390 along parallel optical paths that are vertically displaced from one another. The relay lens 390 transmits each beam of light to the spherical mirror 330 along angled optical paths that intercept at the focal point of relay lens 390. The spherical mirror 330 redirects each angled beam to the diffraction grating 340, where it is spatially dispersed according to wavelength in a substantially horizontal dispersion plane. The spatially dispersed beams of light are transmitted to spherical mirror 330 and redirected back to the switch core 350. The dispersed beams of light pass through deflector array 352 such that each spatially dispersed component corresponding to a separate channel is transmitted through the optical by-pass 351 into the switch core 350.

Figure 3E:
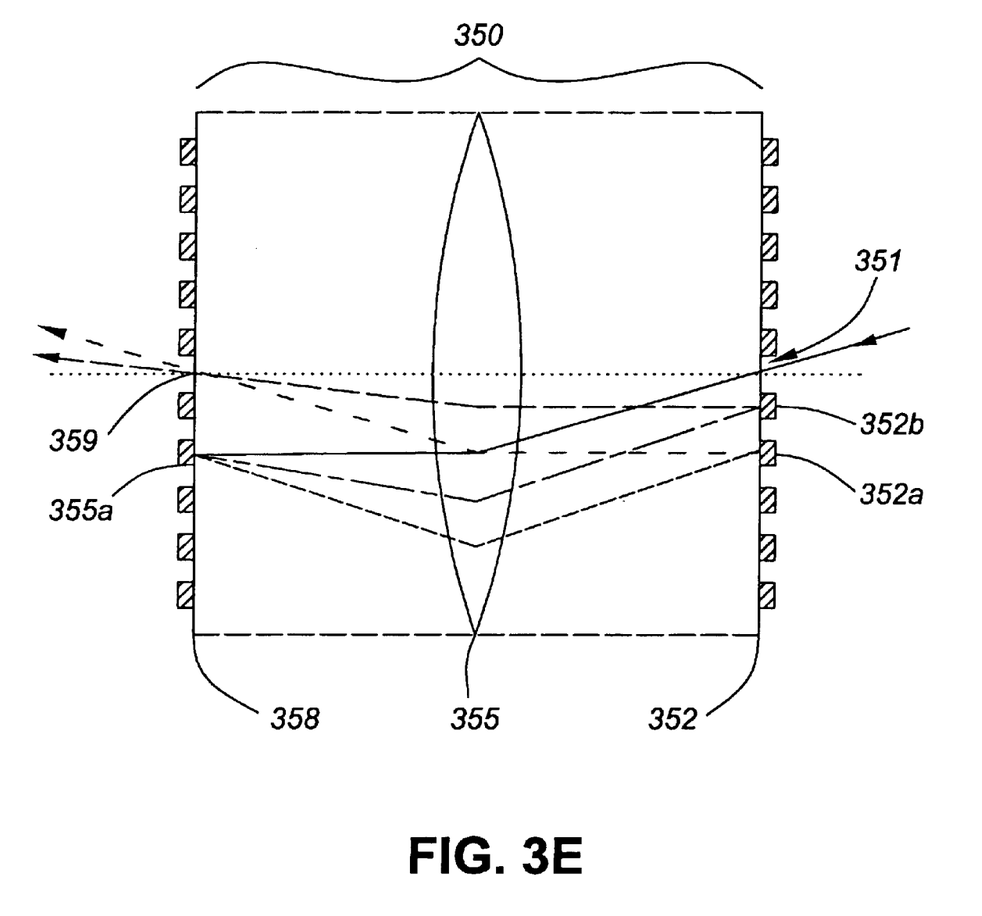
FIG. 3e is a side view of the optical cross-connect illustrated in FIG. 3a showing the operation of the switch core.

Operation of the switch core is illustrated with respect to FIG. 3e, wherein same numerals refer to same parts, without further description. For simplicity, the cylindrical relay lenses 354, 356 have been omitted, and the switch core 350 is shown only switching a single input beam of light. The input beam of light is illustrated by a solid line, while first and second deflected beams of light are shown as dashed and dash/dot lines, respectively.

Referring to FIG. 3e, the angled input beam of light enters the switch core 350 via optical bypass 351 and is transmitted to a micro-mirror 355a on the deflector array 358 along an optical path parallel to the optical axis of the ATO lens 355. In one mode of operation, the micro-mirror 358a on the output deflector array 358 is positioned to deflect the beam of light to the ATO lens 355 along a first optical path (i.e., shown with a dashed line), where it is incident on micro-mirror 352a and is reflected back through the ATO lens 355 such that it exits via optical by-pass 359 at a predetermined angle. In another mode of operation, the micro-mirror 358a on the output deflector array 358 is positioned to deflect the beam of light to the ATO lens 355 along a second optical path (i.e., shown with a dashed/dot line), where it is incident on micro-mirror 352b and is reflected back through the ATO lens 355 such that it exits via optical by-pass 359 at a different predetermined angle. In other words, the MEMS deflector arrays allow any wavelength channel transmitted to array 358 to be switched to any position on the opposite planar array 352 and out of the switch core 350 at a desired predetermined angle. Notably, the above operational description illustrates the angle-to-offset transformations provided by the ATO lens 355. In particular, each angular displacement of light produced by reflector 358a is transformed by the ATO element 355 into a vertical offset on deflector array 352 such that each deflected beam transmitted through the ATO element 355 is transmitted to a separate element of deflector array 352 along parallel optical paths.

Modified sub-beams of light exiting the switch core 350 are transmitted to the spherical mirror 370, are recombined at the diffraction grating 360, are transmitted back to the spherical mirror 370, and are transmitted to the relay lens 395. Conveniently, the symmetric arrangement of relay lens 395 allows the diverging output beams transmitted from the spherical mirror to be collimated such that each output beam is transmitted to one of the plurality of output ports 380.

In each of the above embodiments, the characteristics of the deflector array are similar. For example, for a system with a 60 channel 100 GHz C or L band, 16 inputs and 16 outputs, each deflector array can be in the form of an approximately 18×8 mm$^2$ actuator chip. In one embodiment, the actuator chip includes an array of 60×16 liquid crystal or MEMS pixels, where each pixel is approximately 300×500 microns each. In one embodiment, the gap in the dispersion direction is selected as small as possible (i.e., less than 10 microns), while the gap in the switching direction is selected for a 70% filling factor. In one embodiment, the deflectors are able to produce deflection angles of at least +/−7 degrees, in 1 degree steps, in a direction perpendicular to the dispersion direction.

Advantageously, the use of the ATO lens provides a single switch core that can handle multiple input/output ports, thus significantly reducing the cost of the optical cross-connect. For example, with discrete components such a wavelength cross-connect would require an M port demultiplexor, an M port multiplexor, and an expensive (N×M)×(N×M) optical switch or N (M×M) switches.

Furthermore, providing an ATO lens having a focal length substantially equal to the Rayleigh range conveniently produces a same beam size on both deflector arrays, and thus produces a very compact device. For example, for an 16×60 cross-connect in accordance with the instant invention the physical size of the optics is in the order of 30×20×3 cm$^3$.

Advantageously, the provision of cylindrical re-imaging optics (relay lenses) further achieves a low loss cross-connect.

Of course, numerous other embodiments can be envisaged without departing from the spirit and scope of the invention.

What is claimed is:

1. A wavelength cross-connect comprising:
   an input port for launching an optical beam into the wavelength cross-connect;
   dispersive means for spatially separating the optical beam into individual wavelength channels;
   beam deflecting means optically coupled to the dispersive means for selectively deflecting each of the individual wavelength channels in a predetermined manner;
   an ATO element for providing angle to offset transformation for each of the deflected wavelength channels;
   relay means for relaying light corresponding to each of the individual wavelength channels to and from the ATO element; and
   a plurality of output ports, wherein said wavelength cross-connect is configured for independently switching at least one wavelength channel from the input port to one of the plurality of output ports;
   wherein the relay means includes first and second cylindrical lenses having a same cylindrical curvature, and wherein the ATO element is a third cylindrical lens having a cylindrical curvature perpendicular to that of the first and second lenses.

2. A wavelength cross-connect according to claim 1, wherein the beam deflecting means includes first and second opposed deflector arrays, each deflector array disposed substantially in a focal plane of the ATO element.

3. A wavelength cross-connect according to claim 2, wherein each of the first and second deflector arrays includes one of a liquid crystal phase array and a reflective MEMS array.

4. A wavelength cross-connect according to claim 3, wherein the dispersive means includes first and second dispersive gratings.

5. A wavelength cross-connect comprising:
   an input port for launching a beam of light into the wavelength cross-connect;
   a first dispersive element for dispersing the beam of light into a plurality of sub-beams of light;
   a switch core for routing each sub-beam along a respective predetermined optical path therein;
   a second dispersive element for recombining the plurality of sub-beams routed by the switch core to produce a plurality of output beams of light, each output beam having a composition dependent on the respective predetermined optical paths;
   a plurality of output ports, each output port for respectively receiving one of the plurality of output beams; and
   beam redirecting means for providing an optical pathway between the input port, the first dispersive element, the switch core, the second dispersive element, and the plurality of output ports, wherein the switch core includes:
   i) first and second opposed optical arrays, each optical array including a plurality of independently operable beam deflectors;
   ii) an ATO element having optical power disposed between the first and second opposed optical arrays for providing an angle-to-offset transformation for light transmitted between the first and second optical arrays; and
   iii) relay means for redirecting light transmitted between the first optical array and the second optical array via the ATO element.

6. A wavelength cross-connect as defined in claim 5, wherein the ATO element is a cylindrical lens.

7. A wavelength cross-connect as defined in claim 6, wherein the relay means includes a first cylindrical lens optically disposed between the first optical array and the ATO element, and a second cylindrical lens optically disposed between the second optical array and the ATO element, each of the first and second cylindrical lenses having a cylindrical curvature perpendicular to the cylindrical curvature of the ATO element.

8. A wavelength cross-connect as defined in claim 5, wherein each of the first and second opposed optical arrays includes one of a micro-mirror array and a liquid crystal phase array.

9. A wavelength cross-connect as defined in claim 5, wherein each optical array is substantially disposed near or at a focal plane of the ATO element.

10. A wavelength cross-connect as defined in claim 5, wherein the ATO element has a focal length approximately equal to a near zone length or Rayleigh range of a beam of light incident on the ATO element.

11. A wavelength cross-connect as defined in claim 5, wherein the ATO element is substantially disposed near or at a focal plane of the relay means.

12. A wavelength cross-connect as defined in claim 5, wherein each optical array is substantially disposed near or at a focal plane of the beam redirecting means.

13. A wavelength cross-connect as defined in claim 5, wherein each of the first and second dispersive elements is a diffraction grating.

14. A wavelength cross-connect as defined in claim 5, comprising a polarization diversity unit coupled to the input port.

15. A wavelength cross-connect as defined in claim 5, wherein the beam redirecting means includes first and second spherical mirrors having focal planes, and wherein the input port, the first dispersive element, and an input end of the switch core are disposed substantially in the focal plane of the first spherical mirror and the plurality of output ports, the second dispersive element, and an output end of the switch core are disposed substantially in the focal plane of the second spherical mirror.

16. A wavelength cross-connect as defined in claim 5, wherein each of the first and second opposed optical arrays includes a reflective MEMS array.

17. A wavelength cross-connect as defined in claim 16, wherein each reflective MEMS array includes an optical by-pass for allowing light into or out of the switch core.

18. A wavelength cross-connect as defined in claim 17, comprising a first relay lens optically coupled to the input port for focussing light into the optical by-pass on first optical array and a second relay lens optically coupled to the plurality of output ports for collimating light exiting the optical by-pass on the second optical array.

19. A wavelength cross-connect comprising:

N linearly aligned input ports;

a first diffraction grating for dispersing an input beam of light launched from one of the N input ports into M wavelength channel signals, said first diffraction grating having grating lines substantially parallel to the direction in which the plurality of input ports are aligned;

a first deflector array including N×M independently controlled elements, said first deflector array disposed such that each channel signal transmitted from the first diffraction grating is passed to a separate element on the first deflector array;

a second deflector array including N×M independently controlled elements, said second deflector array opposing the first deflector array;

a cylindrical ATO lens optically disposed between the first and second deflector arrays, said ATO lens disposed for providing angle to offset transformations in a direction parallel to the grating lines;

first and second cylindrical relay lenses disposed for providing optical power in a plane perpendicular to the grating lines, said first relay lens optically disposed between the first deflector array and the ATO lens, said second relay lens optically disposed between the second deflector array and the ATO lens;

a second diffraction grating for combining channel signals transmitted from the second deflector array into a plurality of output beams of light; and N linearly aligned output ports for receiving the plurality of output beams of light.

20. A wavelength cross-connect comprising:

a first optical array including an array of independently controllable deflector elements;

a second optical array including an array of independently controllable deflector elements, said second optical array opposing said first optical array;

a cylindrical ATO lens optically disposed between said first and second optical arrays, said ATO lens disposed for transforming an angle induced by the first optical array into an offset at the second optical array; and first and second cylindrical relay lenses disposed for providing optical power in a plane perpendicular the offset, said first relay lens optically disposed between the first optical array and the ATO lens, said second relay lens optically disposed between the second optical array and the ATO lens.

* * * * *

UNITED STATES PATENT AND TRADEMARK OFFICE
CERTIFICATE OF CORRECTION

PATENT NO. : 6,711,316 B2
DATED : March 23, 2004
INVENTOR(S) : Ducellier It is certified that error appears in the above-identified patent and that said Letters Patent is hereby corrected as shown below:

<u>Title page,</u>
Item [60], "filed on Aug. 13, 2001" should read -- filed on July 25, 2001 --

Signed and Sealed this

Twenty-third Day of November, 2004

JON W. DUDAS
*Director of the United States Patent and Trademark Office*